US012719005B2

(12) United States Patent
Stibor et al.

(10) Patent No.: US 12,719,005 B2
(45) Date of Patent: Aug. 25, 2026

(54) ELECTRON EMISSION METHODS TO GENERATE ELECTRON BEAMS WITH A NARROW ENERGY DISTRIBUTION

(71) Applicant: The Regents of the University of California, Oakland, CA (US)

(72) Inventors: Alexander Stibor, San Francisco, CA (US); Cameron Johnson, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 358 days.

(21) Appl. No.: 18/490,079

(22) Filed: Oct. 19, 2023

(65) Prior Publication Data

US 2024/0145204 A1 May 2, 2024

Related U.S. Application Data

(60) Provisional application No. 63/419,363, filed on Oct. 26, 2022.

(51) Int. Cl.
*H01J 29/48* (2006.01)
*H01J 1/304* (2006.01)

(52) U.S. Cl.
CPC .......... *H01J 29/481* (2013.01); *H01J 1/3044* (2013.01); *H01J 2201/30449* (2013.01); *H01J 2237/06341* (2013.01)

(58) Field of Classification Search
CPC ...................... H01J 7/24–28; H01J 1/30–3048
See application file for complete search history.

(56) References Cited

U.S. PATENT DOCUMENTS

| | | | | |
|---|---|---|---|---|
| 4,414,487 A * | 11/1983 | Yamashita | H01J 37/073 | 315/5 |
| 8,110,814 B2 * | 2/2012 | Ward | H01J 37/252 | 250/424 |
| 2003/0127594 A1 * | 7/2003 | Schneiker | H01J 37/073 | 250/311 |
| 2013/0119252 A1 * | 5/2013 | Kawanami | H01J 37/08 | 313/631 |

FOREIGN PATENT DOCUMENTS

| | | |
|---|---|---|
| JP | H0721954 A * | 1/1995 |
| JP | 2009301920 A * | 12/2009 |

OTHER PUBLICATIONS

Uehara et al. "Superconducting niobium tip for scanning tunneling microscope light emission spectroscopy" Rev. Sci. Instrum. 72, 2097-2099 (2001) (Year: 2001).*

(Continued)

*Primary Examiner* — Mariceli Santiago

(57) ABSTRACT

This disclosure provides systems, methods, and apparatus related to electron emission. A method includes providing a nanotip field emitter. The nanotip field emitter includes a nanoprotrusion at a tip of the nanotip field emitter. The nanotip field emitter is cooled to a temperature. The temperature is about 80 Kelvin or lower. An electric field is applied between an extraction electrode and the nanotip field emitter to induce emission of electrons from the nanotip field emitter.

20 Claims, 11 Drawing Sheets

(56) References Cited

OTHER PUBLICATIONS

Johnson et al., "Near-Monochromatic Tuneable Cryogenic Niobium Electron Field Emitter," Physical Review Letters, vol. 129, p. 244802 1-7, (Dec. 7, 2022).
Binh et al., "Field-Emission Electron Spectroscopy of Single-Atom Tips," Physical Review Letters, vol. 69, No. 17, pp. 2529-2531, (Oct. 26, 1992).
Gohda et al., "Total Energy Distribution of Field-Emitted Electrons from Al(100) Surface with Single-Atom Terminated Protrusion," Physical Review Letters, vol. 87, No. 17, pp. 177601 1-4, (Oct. 22, 2021).
Hou et al., "A nanoemitter based on a superconducting material," Applied Physics Letters, vol. 108, No. 26, pp. 263107 1-4, (Jun. 27, 2016).
Johnson et al., "Electron-Beam Source with a Superconducting Niobium Tip," Physical Review Applied. Vol. 19, pp. 034036 1-13, (Mar. 10, 2023).
Binh et al., "On the electron and metallic ion emission from nanotips fabricated by field-surface-melting technique: experiments on W and Au tips," Ultramicroscopy, vols. 42-44, Part 1, pp. 80-90, (Jul. 1992).
Stibor, "Superconducting niobium nanotip electron field emitter," Lawrence Berkeley National Lab Molecular Foundry, P3 Workshop, 2021.
Stibor, "Superconducting niobium nanotip electron field emitter," Photocathode Physics for Photoinjectors Workshop (virtual event), organized by SLAC National Accelerator Laboratory at Stanford and the Center for Bright Beams (Cornell University), (Nov. 12, 2021).

* cited by examiner

ELECTRON EMISSION METHODS TO GENERATE ELECTRON BEAMS WITH A NARROW ENERGY DISTRIBUTION

RELATED APPLICATIONS

This application claims priority to U.S. Provisional Patent Application No. 63/419,363, filed Oct. 26, 2022, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to electron emission methods.

BACKGROUND

With the rise of novel instruments in electron microscopy, spectroscopy, quantum electronics, and electron wave function engineering, the demand for coherent beam sources becomes increasingly relevant in various fields of physics. Significant progress has been made in the generation of electron field emitters that are, e.g., laser-triggered, have a single atom apex, or consist of a LaB6 nanowire. The key performance goals are high brightness combined with a narrow field emission electron energy distribution, resulting in large longitudinal and transversal coherence. Such sources allow new techniques for electron phase modulation, beam guiding, interferometry, quantum decoherence measurement, novel microscopy diffraction modes, quantum sensing, or even secure information transfer. They lead to key applications in superconducting scanning tunneling microscopy, quantum electron microscopy, or scanning Josephson spectroscopy. According to the Fowler-Nordheim (FN) description, the energy distribution of a beam gets narrower with lower field emitter temperature. But the effect is negligible below room temperature and usually reported energy widths of cold field emitter are ~200 meV.

SUMMARY

One innovative aspect of the subject matter described in this disclosure can be implemented in a method including providing a nanotip field emitter. The nanotip field emitter includes a nanoprotrusion at a tip of the nanotip field emitter. The nanotip field emitter is cooled to a temperature. The temperature is about 80 Kelvin or lower. An electric field is applied between an extraction electrode and the nanotip field emitter to induce emission of electrons from the nanotip field emitter.

Another innovative aspect of the subject matter described in this disclosure can be implemented in an apparatus including a vacuum chamber, a nanotip field emitter positioned within the vacuum chamber, an extraction electrode positioned within the vacuum chamber, a cooling apparatus, and a power source. A tip of the nanotip field emitter includes a nanoprotrusion. The cooling apparatus operable to cool the nanotip field emitter to about 80 Kelvin or lower. The power source operable to apply an electric field between the extraction electrode and the nanotip field emitter to induce emission of electrons from the nanotip field emitter.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6B shows that decreasing the field strength in resonant tunneling emission can shift resonances originally above the Fermi level (or the Fermi edge) $E_F$ into the occupied region, resulting in a tuneable sharp cutoff at low temperatures and an ultranarrow beam energy distribution.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Figure 12:
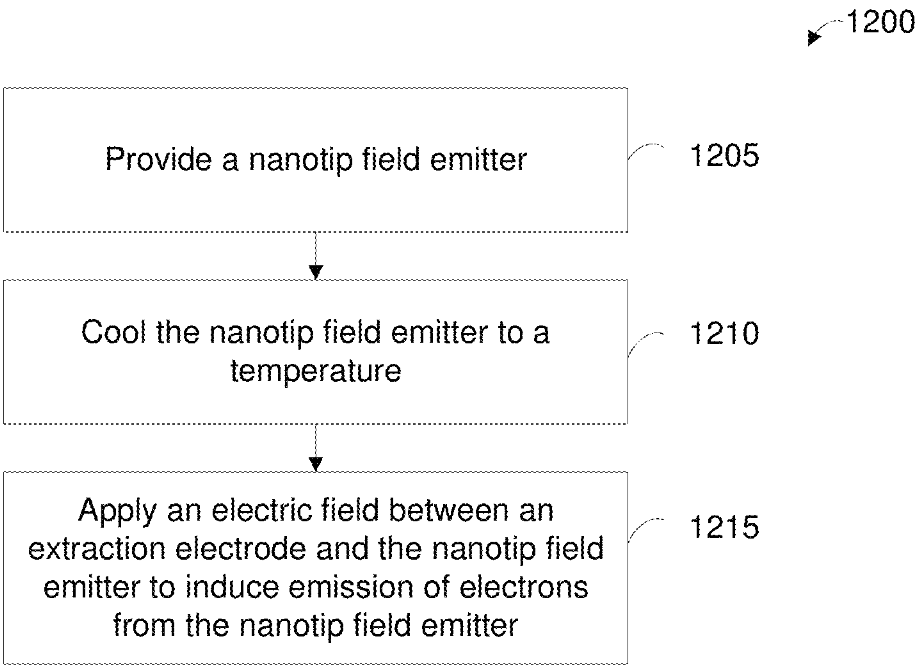
FIG. 12 shows an example of a flow diagram illustrating a method for generating an electron beam.

FIG. 12 shows an example of a flow diagram illustrating a method for generating an electron beam. Starting at block 1205 of the process 1200 shown in FIG. 12, a nanotip field emitter is provided. The nanotip field emitter includes a nanoprotrusion at a tip or the apex of the nanotip field emitter.

In some embodiments, the tip of the nanotip field emitter has a radius of about 10 nanometers (nm) to 50 nm, or about 20 nm to 30 nm. In some embodiments, a tip of the nanoprotrusion has a radius of about 1 nm to 5 nm, about 2 nm to 3 nm, or about 1.5 nm. In some embodiments, the nanotip field emitter is or comprises a monocrystalline refractory metal. In some embodiments, the refractory metal is niobium or tungsten. In some embodiments, the nanotip field emitter is or comprises a polycrystalline refractory metal. In some embodiments, the refractory metal is niobium or tungsten.

At block 1210, the nanotip field emitter is cooled to a temperature. In some embodiments, the temperature is about 80 Kelvin or lower. In some embodiments, the temperature is about 6 Kelvin or lower. In some embodiments, the temperature is about 4.2 Kelvin. The temperature of the nanotip field emitter defines the steepness of the Fermi edge. The temperature is specified to be low enough so that the Fermi edge is steeper than the FWHM (full-width-at-half-maximum) of the Lorentzian-shaped energy distribution peak of the field emission from the quantum states in the nanoprotrusion on the nanotip field emitter.

At block 1215, an electric field is applied between an extraction electrode and the nanotip field emitter to induce emission of electrons from the nanotip field emitter, or more specifically, the nanoprotrusion. In some embodiments, the electric field is about 200 V to 1500 V.

In some embodiments, the electric field is between the extraction electrode and the nanotip field emitter is increased or decreased. Increasing or decreasing the electric field can shift the resonant emission peak in the energy spectrum toward the sharp Fermi level to cut it off and decrease the FWHM of the beam's energy distribution. By applying an additional electric field between the nanotip field emitter and the extraction electrode, the Lorentzian shaped energy distribution peak of the electron field emission is shifted towards the Fermi edge. Shifting the energy distribution peak towards a low-temperature Fermi edge cuts off the electron emission on the high energy side because the Fermi edge separates the occupied from the non-occupied electron states in the material. This shifting of the energy distribution peak generates a narrow electron energy distribution with an adjustable width in the emitted beam from the nanotip field emitter. In some embodiments, an electron energy distribution full width half maximum of the emitted electrons is about 10 millielectron volts (meV) to 70 meV, or about 16 meV. In some embodiments, a beam current of the emitted electrons is about 10 picoamperes to 6 nanoamperes (nA), or about 2 nA to 6 nA. In some embodiments, a narrow electron energy distribution with a full-width-half-maximum (FWHM) of about 16 meV at a temperature of about 5.9 K or about 40 meV at a temperature of about 80 K can be obtained The nanoprotrusion size and operating conditions (e.g., high current emission) can increase the width of the field emission energy distribution. For example, a typical field emitted electron beam energy distribution of the nanotip applying the methods described herein at a beam current of 4.1 nA was 69 meV with a reduced brightness of $3.8\times10^{8}$ A/($m^2$ sr V).

In some embodiments, the nanotip field emitter is under ultrahigh vacuum. Ultrahigh vacuum is generally considered to be lower than about $7.5\times10^{-9}$ Torr. In some embodiments, the nanotip field emitter is under a vacuum of about $8\times10^{-11}$ Torr. In some embodiments, the extraction electrode is under the same vacuum conditions as the nanotip field emitter.

In some embodiments, the electric field is increased or decreased to shift the electron resonant emission energy peak from the quantum states in the nanoprotrusion towards the steep low-temperature Fermi edge. In some embodiments, this serves to cut off the higher energy side of the peak and to narrow the electron energy distribution of the emitted electron beam. In some embodiments, the electric field is increased or decreased by about 1 V to 500 V between the tip and the extraction electrode.

Figure 13:
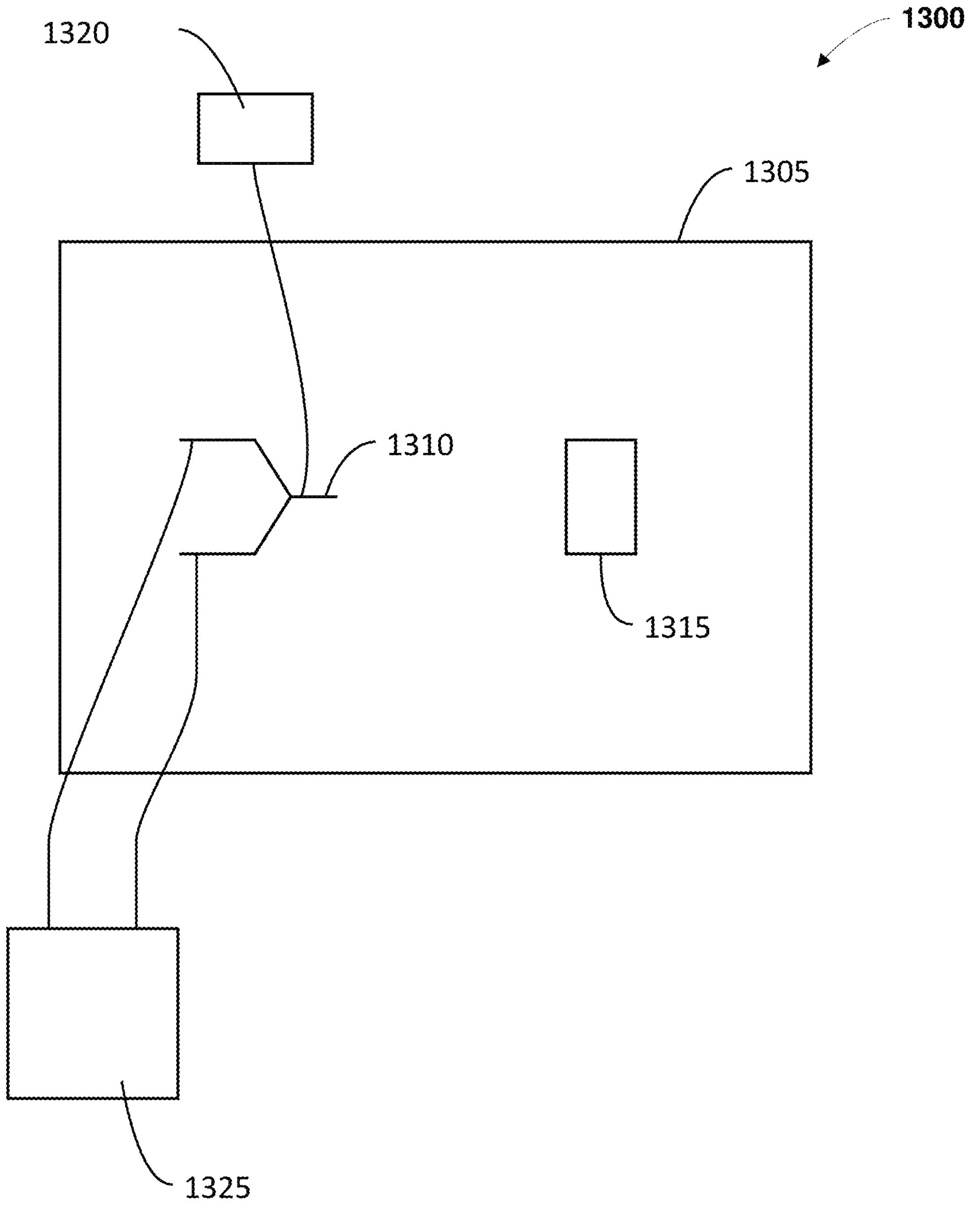
FIG. 13 shows an example of a schematic illustration of an apparatus operable to generate an electron beam with a narrow energy distribution.

FIG. 13 shows an example of a schematic illustration of an apparatus operable to generate an electron beam with a narrow energy distribution. Embodiments of the apparatus can be used to implement the methods described herein. The apparatus 1300 shown in FIG. 13 includes a vacuum chamber 1305, a nanotip field emitter 1310 positioned within the vacuum chamber 1305, an extraction electrode 1315 positioned within the vacuum chamber 1305, a cooling apparatus 1320, and a power source 1325. A tip of the nanotip field emitter 1310 includes a nanoprotrusion (not shown). The cooling apparatus 1320 is operable to cool the nanotip field emitter 1310 to about 80 Kelvin or lower. The power source 1325 is operable to apply an electric field between the extraction electrode 1315 and the nanotip field emitter 1310 to induce emission of electrons from the nanotip field emitter 1310.

In some embodiments, the cooling apparatus 1320 comprises a cryostat. In some embodiments, the cryostat includes a thermally conductive material 1330 in contact with the nanotip field emitter 1310. In some embodiments, the cryostat is a liquid helium cryostat. In some embodiments, the cryostat is a liquid nitrogen cryostat. In some embodiments, the cryostat includes a heater (not shown) so that the temperature of the nanotip field emitter 1310 can be held at a specified temperature.

EXAMPLE

The following examples are intended to be examples of the embodiments disclosed herein, and are not intended to be limiting.

Figures 1A, 1B, 1C:
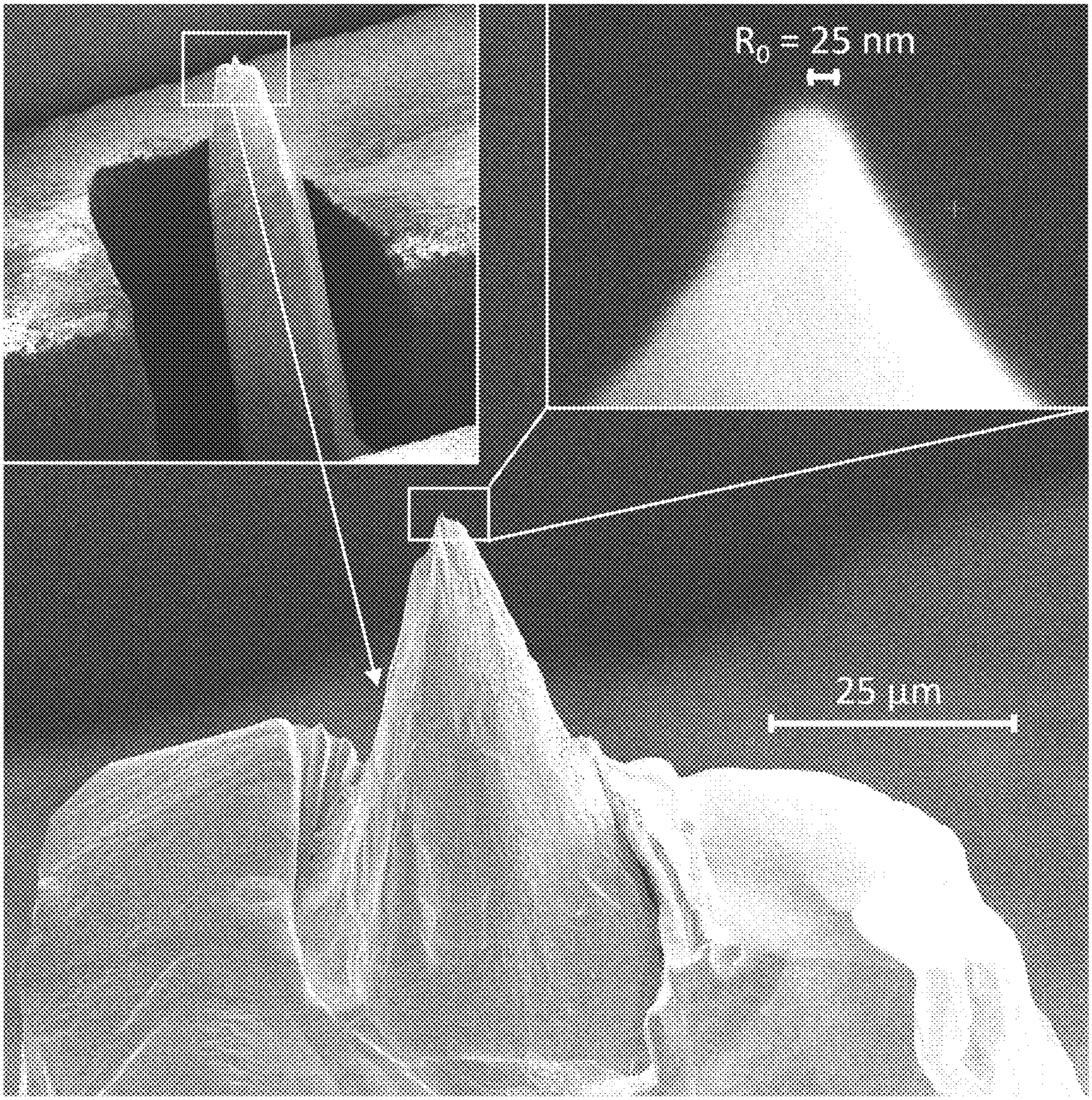
FIGS. 1A-1C show SEM images of a focused ion beam (FIB) milled monocrystalline tip in three different magnifications.

Described below are the field emission properties of a monocrystalline niobium (Nb) nanotip at a temperature of 5.9 K, well below the superconducting transition at Tc=9.3 K. A scanning electron microscope image of the tip is shown in FIGS. 1A-1C. It is demonstrated that a surface nanoprotrusion can be generated on the tip, leading to a localized quantum band state at the apex. The nanoprotrusion emission (NPE) is self-focusing with an emission angle of 3.2° due to the high field enhancement at the nanoprotrusion apex with a small radius of curvature. The center of the NPE total energy distribution spectral peak can be tuned relative to the Fermi energy ($E_F$) and cut off by the sharp low-temperature Fermi edge by changing the electric field at the emitter. It leads to a narrow energy distribution full width at half maximum (FWHM) down to $\Delta E$=16 meV. This is the first monocrystalline Nb tip characterized at superconducting temperatures and the smallest reported electron field emitter energy width. It is 10 to 20 times narrower than the best emitters available in microscopy, leading to high coherence, while showing long-time stability and high brightness. This will lead to a paradigm shift in electron microscopy and spectroscopy, enabling electron energy loss spectroscopy with <2.5 meV resolution and decreasing the impact of chromatic aberrations.

The Nb tip and the nanoprotrusion on its apex were fabricated in five steps. First, a rectangular monocrystalline wire being the base of the tip was cut out from a larger [100] oriented Nb crystal in pieces of 250×250 μm cross section with electric discharge machining. Then, this wire was spot welded in the center of a V-shaped polycrystalline Nb wire bar. As a next step, the monocrystalline tip base was electrochemically etched down to a length of only ~2 mm in a KOH solution according to a procedure described in the scientific literature. This led to the ~100 μm base shown in the SEM images of FIGS. 1A and 1B. It is then further shaped by gallium ion beam milling in a FIB to fabricate the conical tip in FIG. 1C with a radius $R_0$=25±2 nm. The most delicate step is the formation of a nanoprotrusion (<5 nm) on the tip after being installed and cooled on the cryostat. This is performed through several annealing cycles by ramping up a current of 4.85 A through the polycrystalline Nb wire bar until the tip is glowing at ~950° C. and simultaneously setting a −3 kV electrical bias on the extractor. By automating this annealing process with a programmable current source, nanoprotrusion formation on the tip is reproducible and the NPE is stable on the order of hours. However, there is still variability in the emission properties of the nanoprotrusions after each annealing process, making several annealings necessary to obtain the optimal conditions. The nanoprotrusion survives at a minimum 82 K. It is assumed to be RT stable and made of niobium due to corresponding literature data for tungsten and gold tip nanoprotrusions fabricated by a similar field surface melting technique. This is in contrast to diffusion-growth nanoprotrusions, which are believed to be composed of contaminant molecules.

Figure 4:
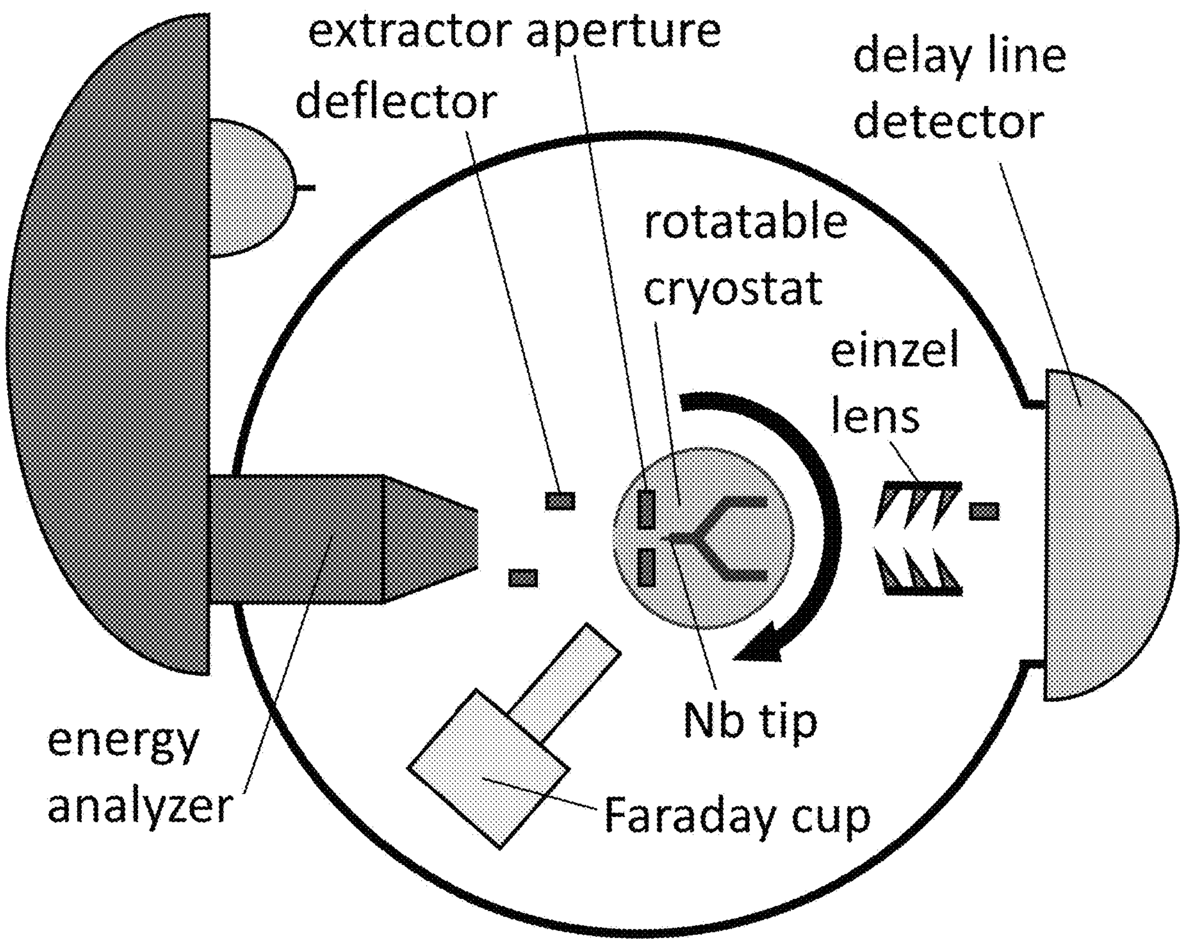
FIG. 4 shows a schematic illustration of an electron field emitter characterization setup. The tip and the bar are sandwiched between two sapphire plates (visible in FIG. 1B) and mounted onto a rotatable cryostat perpendicular to the rotation axis, allowing it to be pointed at multiple measurement devices.
Figure 5:
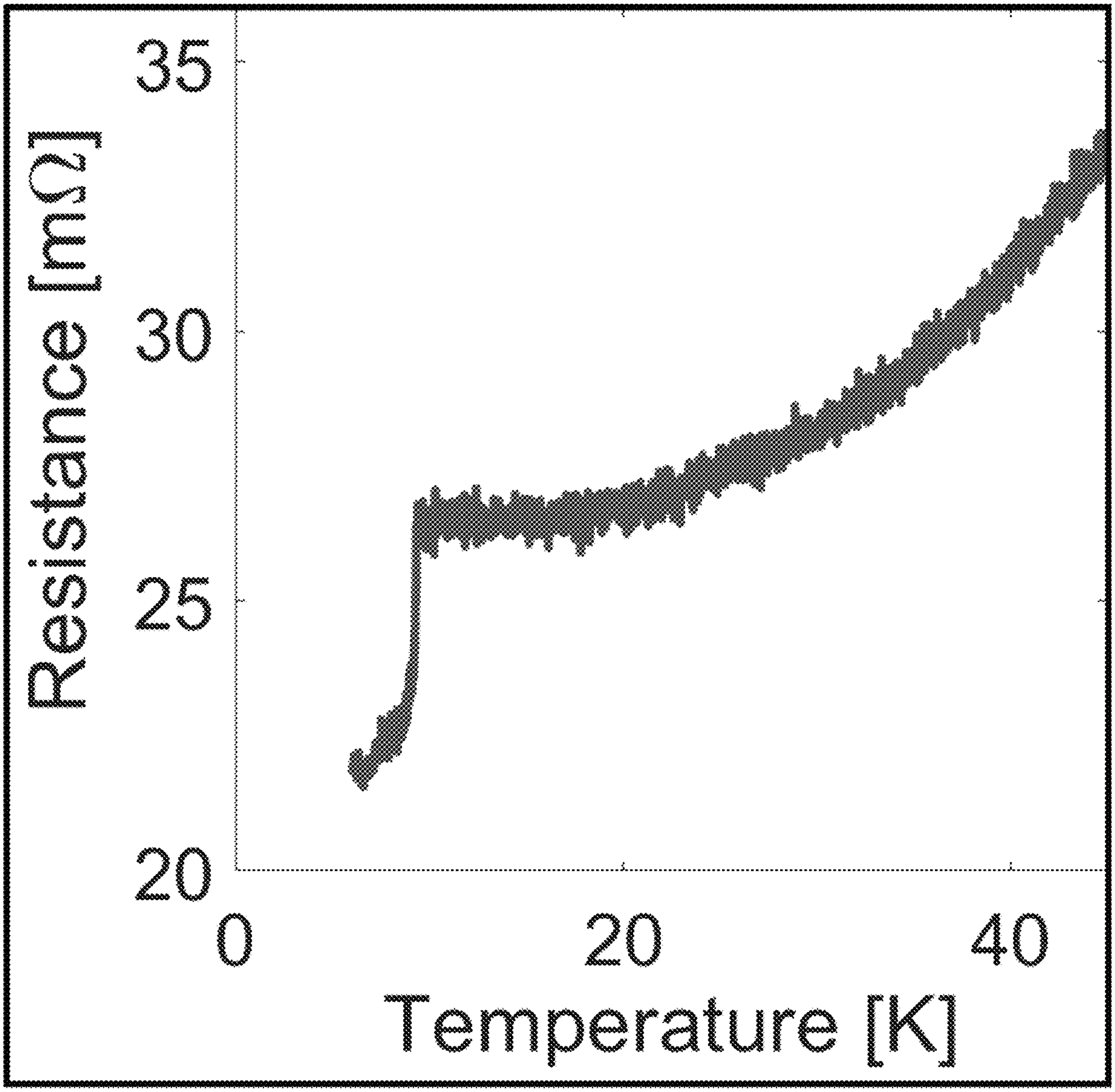
FIG. 5 shows a four-point resistance versus temperature measurement of the tip's bar, indicating superconducting emitter conditions.

The setup to cool the tip and characterize its field emission properties is illustrated in FIG. 4. It allows a high-resolution measurement of the beam energy spectra, the emission current, and the angular distribution. The nanotip and the extractor are cooled by a closed-cycle liquid helium cryostat and thermally isolated by a copper cooling shield with a small opening for the beam path. The step in the four-point resistance measurement of the V-shaped Nb bar in FIG. 5 is used to calibrate the measured temperatures to Tc and reveals that the emitter is operating under superconducting conditions at 5.9 K. The cryostat is mounted inside an ultrahigh vacuum chamber with a pressure of $\sim 8\times10^{-11}$ Torr on a rotational flange and a 3D manipulator. It allows positioning and aligning of the emitter toward three measurement units. The first one is a hemispherical electron beam energy analyzer with a resolution of 3 meV. Between the analyzer and the tip, a double deflector is installed for beam alignment. A rotation of the cryostat points the tip toward a Faraday cup with a picoammeter for the beam current measurements. Another rotation points the emitter toward a microchannel plate delay line detector (DLD) with a single-electron resolution to measure the beam's angular distribution. A custom einzel lens with a deflector is also installed at this position for magnification and alignment. The analyzer, Faraday cup, and DLD operate in different regimes of current and tip voltage, allowing a wide range of beam analysis. This realizes a unique system that combines spectroscopy, beam current, spatial distribution, and temperature control.

The energy spectrum of FN cold field emission of electrons from a metal's Fermi sea to vacuum with respect to $E_F$ is given by the product of the Fermi-Dirac distribution function and an exponential decay term $G(E)\propto f(E)\exp(E/D)$. Here, $f(E)=[1+\exp(E/k_BT)]^{-1}$ and $D=ehF/2\sqrt{2m\phi}$ is the energy scale parameter for field emission with the work function $\phi$ and the field strength at the emission site $F=|E|$. The field strength can be determined by $F=\beta V_{tip}$, where $\beta=(kR_0)^{-1}$ with $R_0$ being the base radius and a geometry factor typically taken as k=5.7 for a metallic tip. The FN emission current density goes as $J\propto F^2\exp(-B\phi^{3/2}/F)$, where $B\approx7$ V/eV$^{3/2}$ nm. At cryogenic temperatures, f is nearly a step function, causing the energy spectrum width to scale as $\Delta E=\ln(2)D$ [with FWHM, the solution to $\exp(\Delta E/D)=1/2$] due to the decreasing tunnel width through the Coulomb barrier with increasing F.

Figure 2:
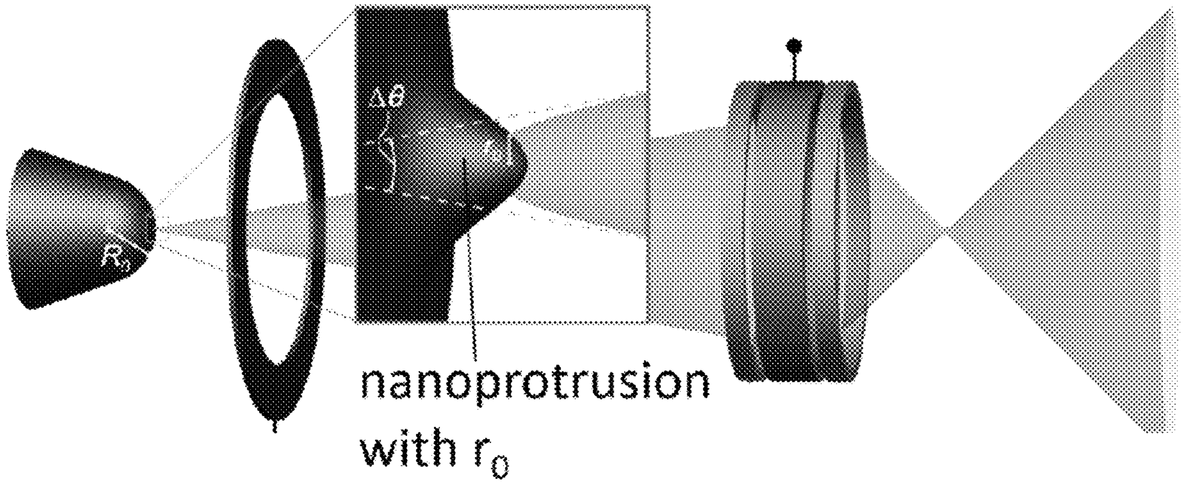
FIG. 2 shows a schematic illustration of a nanoprotrusion on a nanotip field emitter. On top of the $R_0$=25 nm radius Nb tip, an $r_0$=1.5 nm nanoprotrusion is formed that is not resolved by SEM. The nanoprotrusion's field emission is magnified by an einzel lens.
Figure 3:
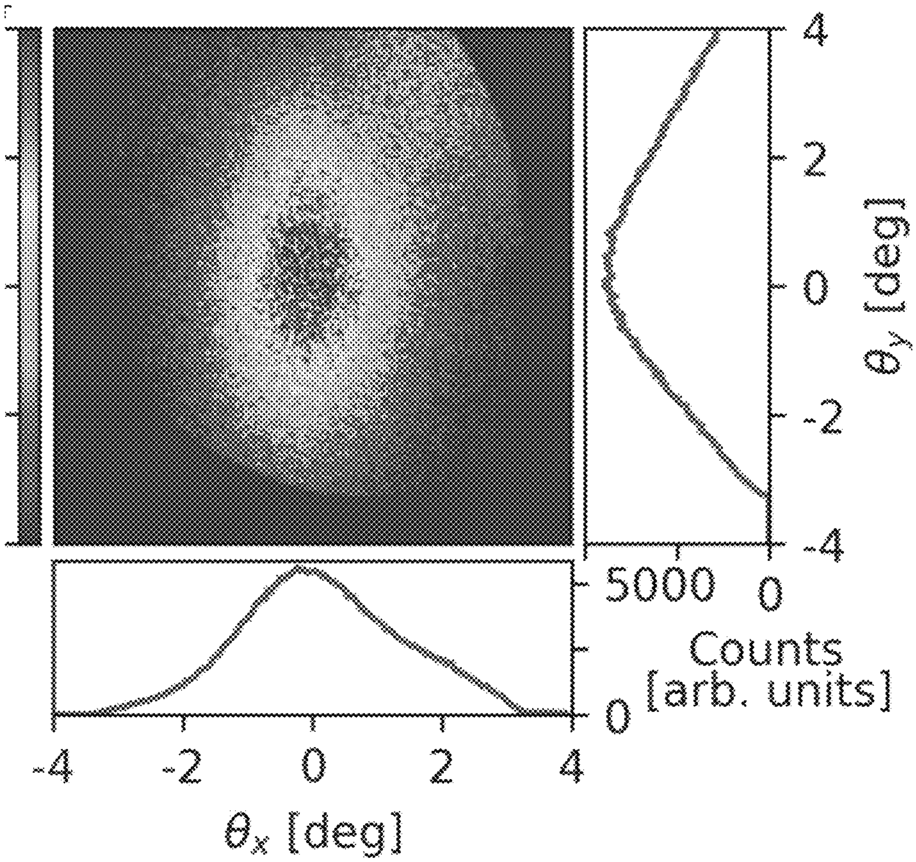
FIG. 3 shows a delay line detector image of the beam's angular distribution with Vtip=−364 V (Vext=0 V), yielding a mean angular spread of $\Delta\theta \approx 3.2°$.
Figures 6A, 6B:
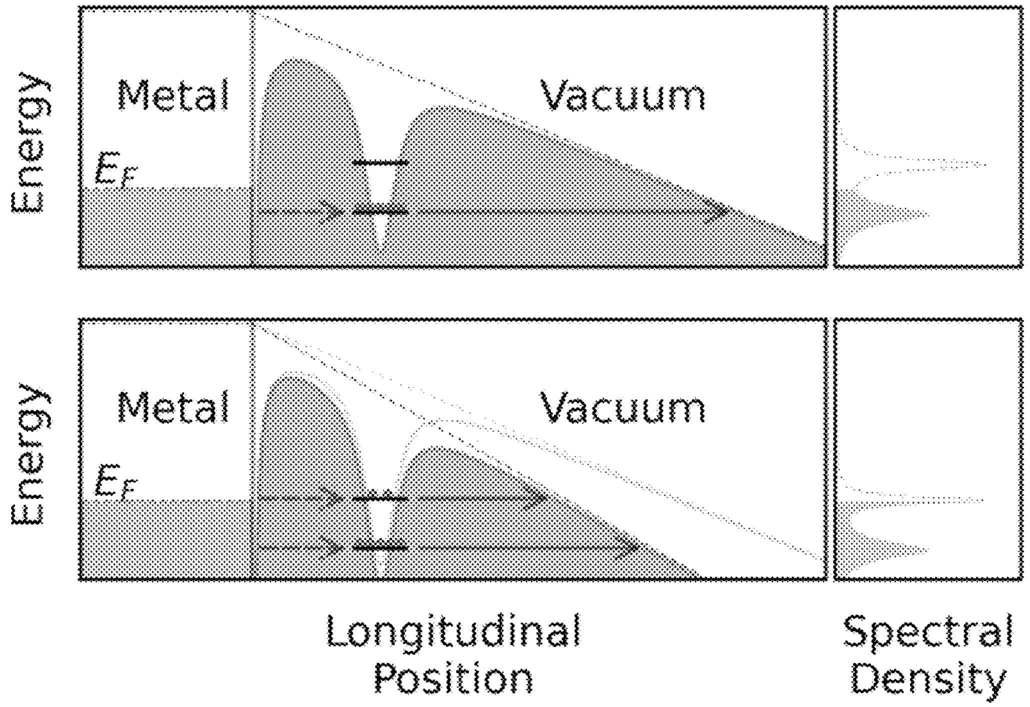
FIGS. 6A and 6B show qualitative illustrations of a nanoprotrusion's resonant states in the Coulomb barrier, allowing electrons an enhanced field emission to the vacuum.

The addition of a nanoprotrusion with radius $r_0 \ll R_0$ on the tip apex creates localized, discrete electronic states that can act as intermediate levels for resonant tunneling through the Coulomb barrier, and FN theory alone is no longer sufficient to model the emission. The energy spectrum of NPE via these resonant states can be approximated as, $G_{tot}(E)=G(E)[1+\Sigma_n R_n(E-E_n+\alpha F)]$, where the resonant enhancement factors $R_n$ are single peaked functions (Lorentzian distributions in analytic approximation) corresponding to each discrete state at energy $E_n$ that shifts linearly with the applied field strength at the tip. The maxima of the resonant enhancement factors can be $|R_n|_{max}>>\exp(-(E_n-\alpha F)/D)$ for emission well below $E_F$; this means that NPE with isolated bright resonant tunneling spectral peaks can occur even before any FN field emission is measurable. Additionally, at cryogenic temperatures, the width of the Fermi edge is much narrower than the width of any $R_n$ peak, allowing NPE peaks to be "turned off" or partially truncated by tuning over $E_F$. The resonant tunneling field emission process is illustrated in FIGS. 6A and 6B. The electric field around a biased nanoprotrusion on a nanotip autofocuses the NPE into an emission angle ~2-6°, as illustrated in FIG. 2. This is much smaller than emission from a tip geometry without the nanoprotrusion, which would be within ~20-30°. Using an einzel lens with a calibrated magnification and the DLD, the angular beam distribution was determined in FIG. 3 as $\Delta\theta\approx3.2°$ (azimuthally averaged emission angle). With a reasonable assumption that the nanoprotrusion is hyperboloidal, the size of the emission radius on the nanoprotrusion was estimated from the measured values of $R_0$ and $\Delta\theta$, using the relation $r_0=R_0\phi\Delta\theta^2/2D$. Inserting the appropriate values for the tip $R_0=25\pm2$ nm, $\Delta\theta=3.2\pm0.25°$, D=118 meV, $\phi=4.5$ eV at $V_{tip}=-364\pm2$ V, an emission site radius of $r_0=1.5\pm0.3$ nm can be determined.

Figure 7:
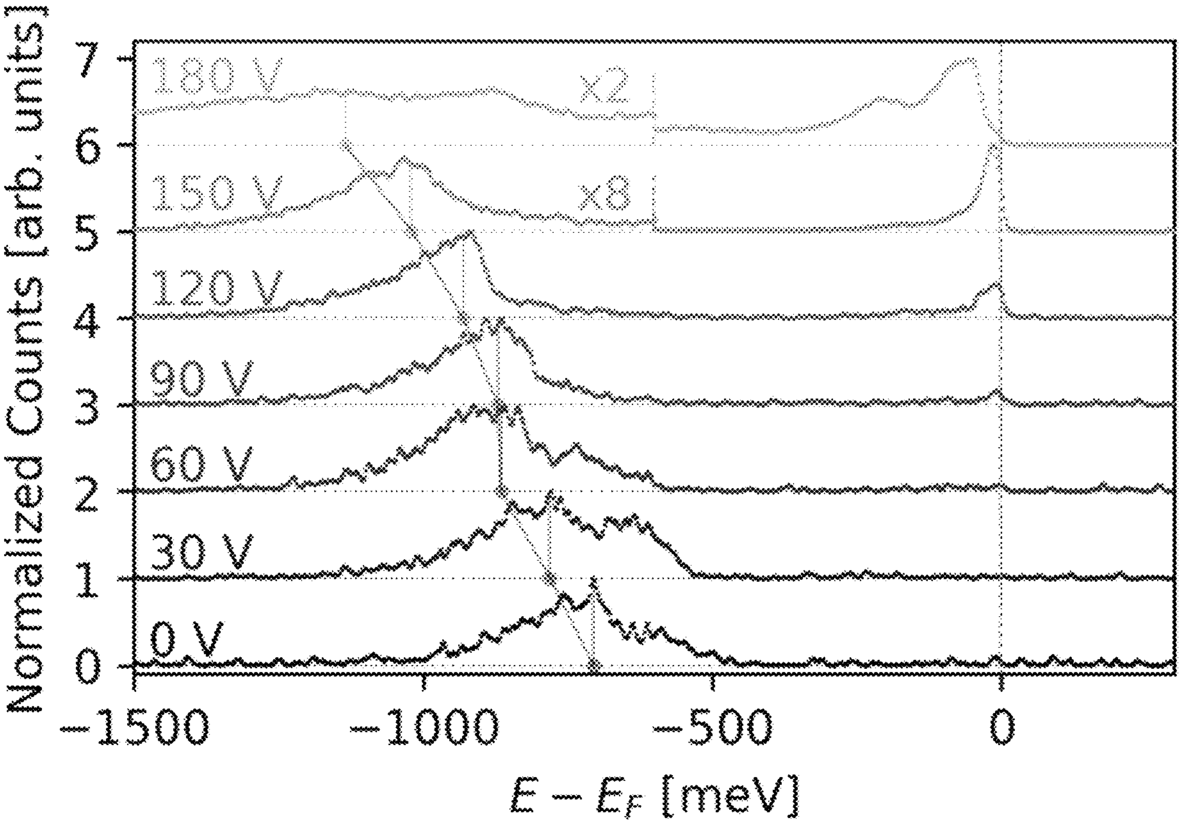
FIG. 7 shows experimental spectra showing the nanoprotrusion emission peaks decreasing in energy by increasing the extractor voltage Vext from 0 to 180 V at a fixed tip voltage of Vtip=−475 V.

Furthermore, the energy spectrum of the NPE was recorded with an energy analyzer. By keeping the tip voltage constant and varying the extractor voltage to tune the NPE with respect to $E_F$, the NPE energy spectra were recorded in FIG. 7 from two distinct nanoprotrusion states. The broad lower energy peak is shifted away from $E_F$ at a linear rate of ~2 meV $V^{-1}$. The higher energy peak is initially above $E_F$ and begins to cross $E_F$ at $V_{ext}=90$ V. It has a $\Delta E=34$ meV FWHM at $V_{ext}=150$ V and completely passes $E_F$ at $V_{ext}=180$ V showing a $\Delta E=100$ meV FWHM main peak. Nominally similar values of peak widths and energy shifts are regularly reproduced after each tip anneal and nanoprotrusion formation.

Figure 8:
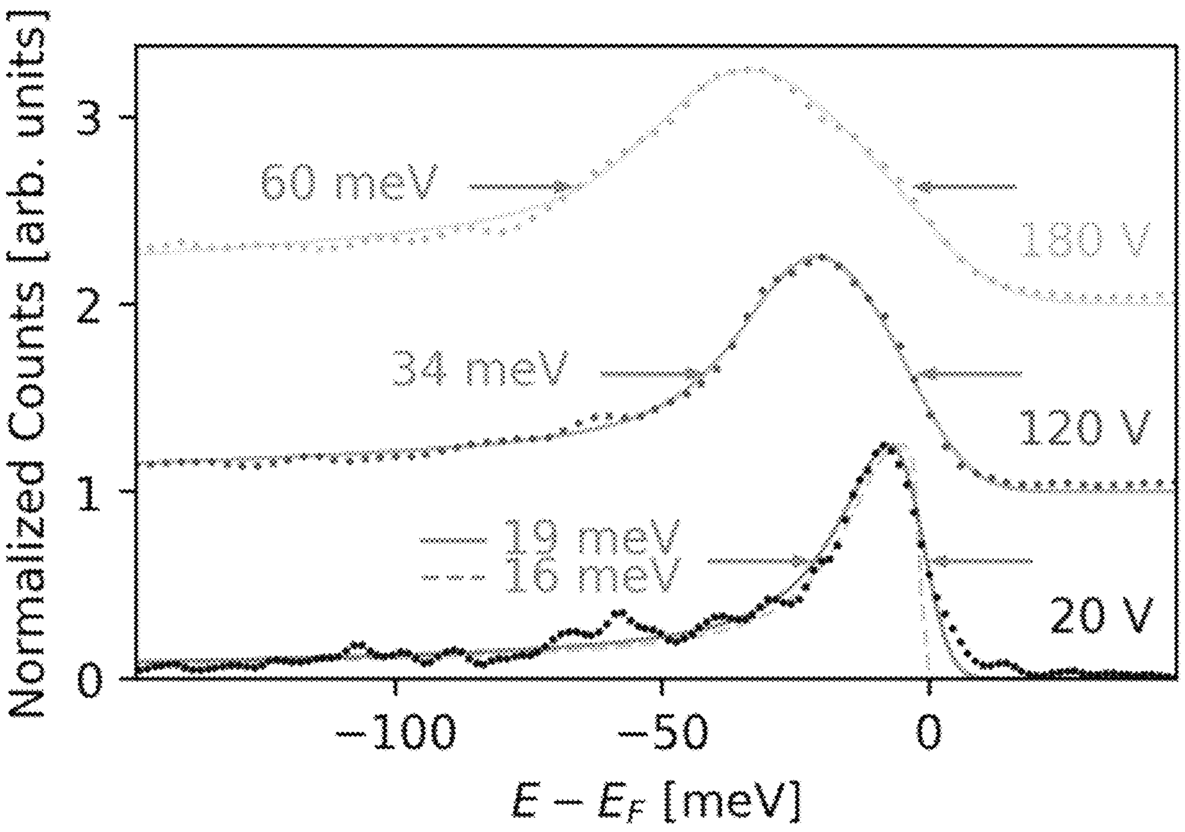
FIG. 8 shows the narrowest energy distribution observed of 16 meV after noise correction (19 meV before). The small energy width is due to the use of the sharp low-temperature Fermi edge to increasingly truncate the higher energy portion of the nanoprotrusion's discrete state emission by applying an extraction voltage of 180, 120, and 20 V, pushing the resonance peak over $E_F$.

The direct tunability of these discrete nanoprotrusion states by the tip or extractor voltage allows for the reduction of the energy width by truncating a portion of the NPE spectrum, with the sharp (less than 1 meV), low-temperature Fermi-Dirac function at $E_F$. It is significantly narrower than the FWHM of the NPE from the discrete states, producing a total FWHM $\Delta E=19$ meV at a tip voltage of $V_{tip}=-475$ V with $V_{ext}=20$ V. This is the smallest $\Delta E$ value ever recorded for field-emitted electrons. The result is presented in FIG. 8 showing the spectrum width decreasing at lower $V_{ext}$ as the peak shifts toward $E_F$ from below. $G_{tot}(E)$ convolved with a kernel, being a normalized Gaussian distribution $g(E,dE)=\exp(-x^2/2dE^2)/\sqrt{2\pi dE^2}$ to account for systematic instrument noise (analyzer, voltage source, vibrations), was used as a fit for the total energy distribution: $G_{fit}(E)=G_{tot}(E)*g(E)$. $R_n(E)=r_n/[(E-E_n)^2+\Gamma_n^2]$ was taken as the form for the resonant enhancement factors, where $r_n$ are the resonance amplitudes, and $\Gamma_n$ are the resonance linewidths. With $r_n$, $E_n$, $\Gamma_n$, and dE as fitting parameters, a least squares fit to the experimental spectra was performed. Using the fit parameters $r_n$, $E_n$, $\Gamma_n$ in the function $G_{tot}$, an 8.2 meV system energy resolution was determined. If it is deconvolved from the measured energy distribution, the narrowest emission peak has a FWHM of 16 meV.

Figure 10A:
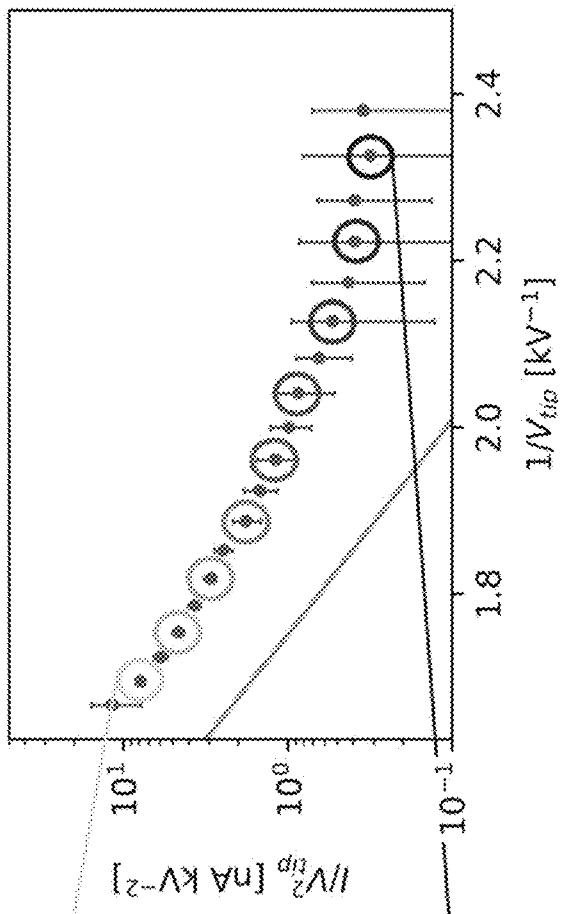
FIG. 10A shows a Fowler-Nordheim (FN) plot of a nanoprotrusion's emission current with decreasing Vtip from −600 to −420 V.
Figure 9:
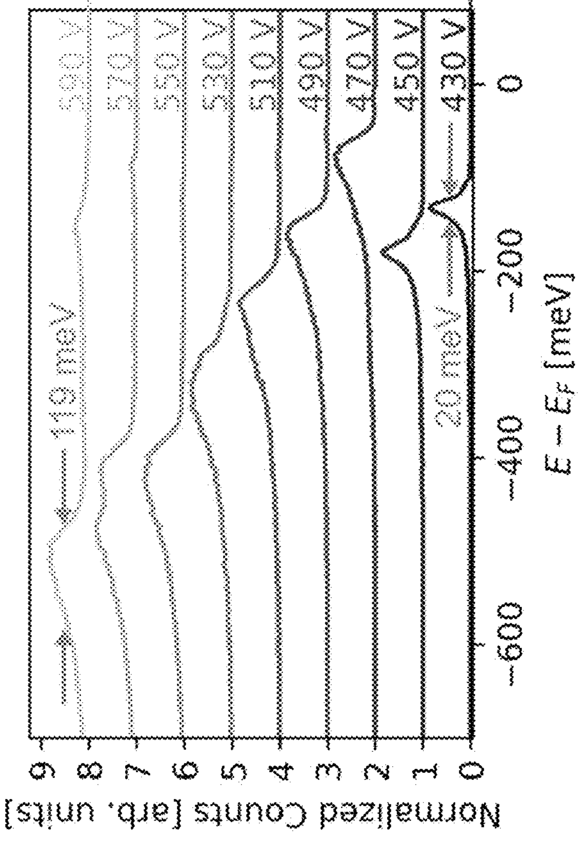
FIG. 9 shows energy spectra corresponding to the encircled data points in FIG. 10A with the tip voltage labeled on the right side (Vext=0). The spectra with increasing Vtip correspond to the circles in FIG. 10A from right to left.
Figure 10B:
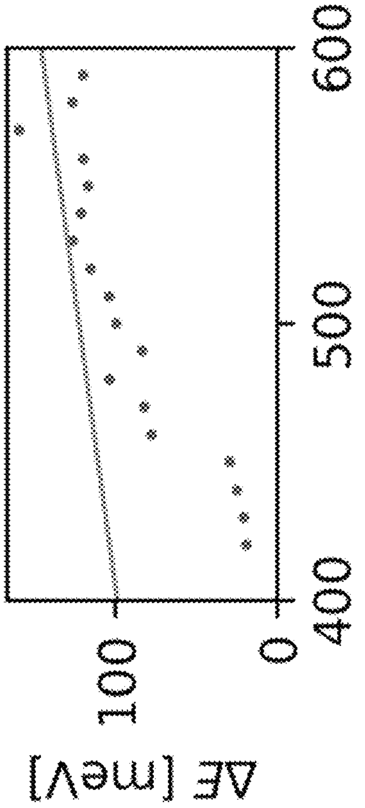
FIG. 10B plots the energy FWHM ΔE as a function of the tip voltage. The lines on the graphs are theory expectations for a pure FN behavior, confirming that the resonant emission process is different compared to a FN emitter.
Figure 11A:
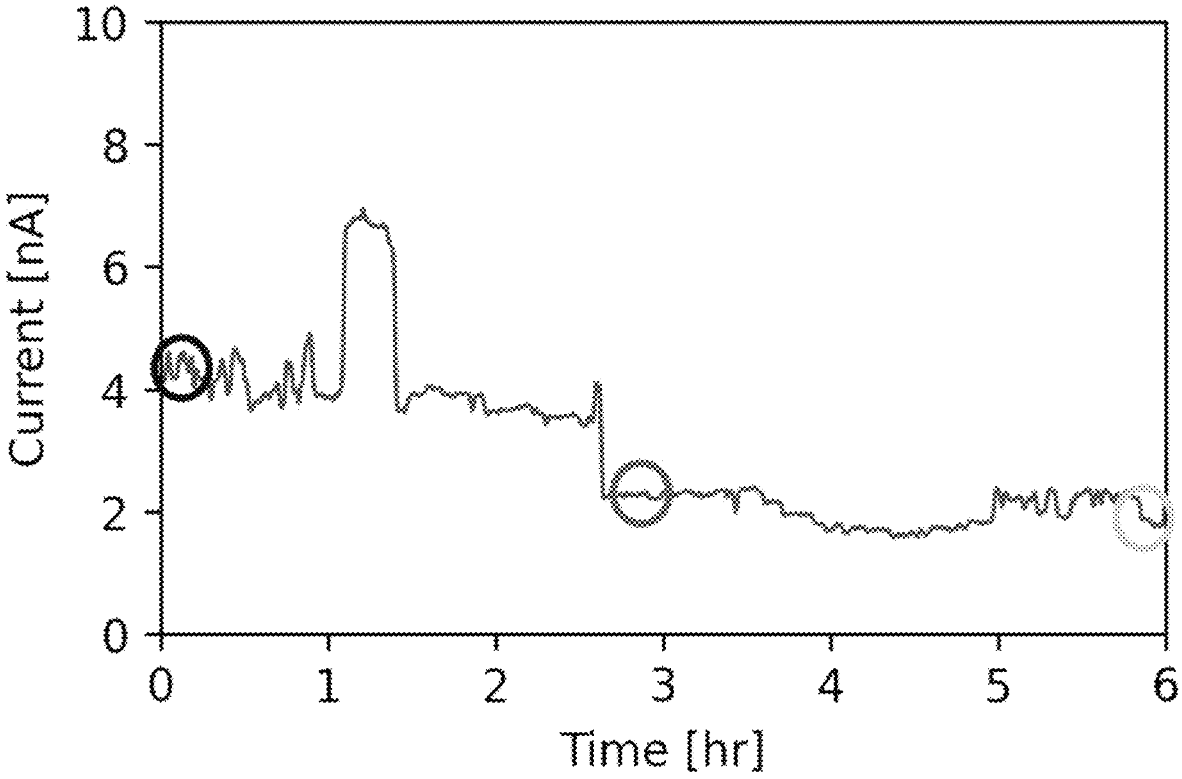
FIG. 11A shows a stability measurement of the Nb field emitter over 6 h. The sudden increase after 1 h is a familiar effect observed in other cold field emitters and can be explained by the temporary presence of an adatom on the emission site.
Figure 11B:
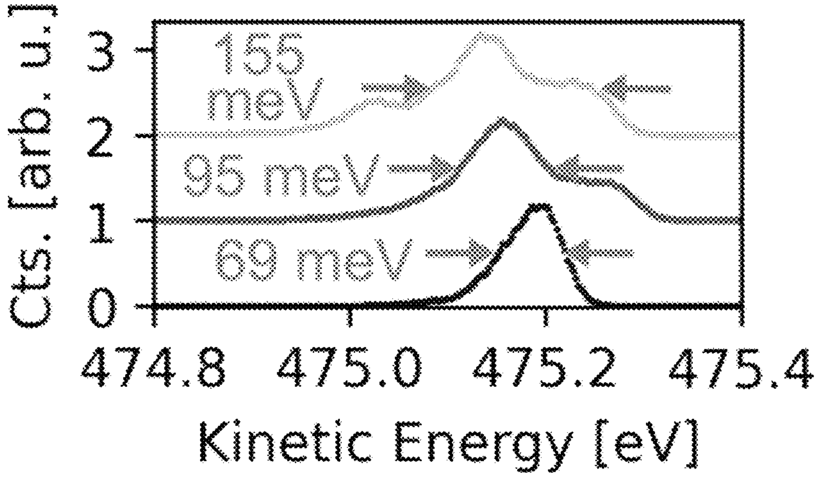
FIG. 11B shows energy spectra taken at the beginning of the recording of FIG. 11A, after 3 h, and at the end. A reasonable peak broadening is visible, presumably due to adatoms accumulating near the tip's apex or small structural changes that alter the boundary conditions for the nanoprotrusion resonant emission. The data in FIGS. 7 through 11B were recorded after different annealing cycles, with slight variations in the nanoprotrusion geometry and resonance conditions. The peak amplitudes in the spectra are normalized.

In the next step, a Faraday cup was used to measure the total NPE current. After further annealing, a nanoprotrusion was formed and the tip voltage was decreased from $V_{tip}=-600$ V to $V_{tip}=-420$ V in steps of 10 V at zero extraction voltage, and the emission current was recorded. The I/V data is shown in FIG. 10A in a FN representation, where the linear relation between $1/V_{tip}$ and $\log(I/V^2_{tip})$ (line in FIG. 10A) would be expected to apply the FN theory. Clearly, the measured resonance emission data indicates a strong deviation from FN. After this measurement, the tip was pointed toward the energy analyzer for the recording of the spectra at the same tip voltages. It allows correlating the current data with the energy widths of the emissions, as shown in FIG. 9. FIG. 10B plots the energy FWHM $\Delta E$ as a function of the tip voltage, again with an orange line reflecting the FN expectation. It demonstrates that resonant field emission can provide a significantly narrower energy width than the FN process. After further annealing, a field emission stability measurement over 6 h was performed, as shown in FIG. 11A. It was started by the recording of a spectrum at $V_{tip}=-480$ V with an energy FWHM of 69 meV at an emission current of about 4.1 nA. Subsequently, the current was recorded for 3 h before the tip was pointed again toward the energy analyzer, where a spectrum with a FWHM of 95 meV was recorded. After further current measurement for 3 h, a final spectrum was taken with a width of 155 meV. The spectra are shown in FIG. 11B. Finally, the angular beam distribution (at a lower tip voltage to avoid DLD damage) presented in FIG. 3 was recorded.

One important figure of merit for electron sources is the reduced brightness $B_r=J/\Delta\Omega V_{tip}$, where $J=I/\pi r_0^2$ is the current density, and $\Delta\Omega=\pi\Delta\theta^2/4$ is the solid angle of emission. This is an invariant quantity along the beam path and a more apt way to compare different emission sources than current alone. In the nanoprotrusion model, the angle of emission goes as $\Delta\theta\propto\sqrt{V_{tip}}$. Since it was not possible to measure the angular distribution of the NPE at high currents with the microchannel plate of the DLD, the relation $\Delta\theta_2=\Delta\theta_1\sqrt{V_{tip,2}/V_{tip,1}}$ was used to determine the high current, 4.1 nA, angular distribution $\Delta\theta_2=3.7\pm0.29°$ at $V_{tip,2}=-480\pm3$ V from the measurement in FIG. 3. Then, using the determined NPE radius $r_0=1.5\pm0.3$ nm, a reduced brightness of the source was determined to be $B_r=(3.8\pm2.1)\times10^8$ A/(m$^2$ sr V) at an energy FWHM of 69 meV. This extremely high brightness combined with the low energy width outperforms commercial cold field emission sources and other NPE tips. For comparison, a commercial source with a monochromator has a comparable energy distribution of 61 meV but only a reduced brightness of $6.3\times10^6$ A/(m$^2$ sr V). The calculations reveal that applying a monochromator to a beam with 4 nA current at 69 meV, such as in FIG. 11A, will lead to 400 pA with 8 meV or 100 pA with 2.5 meV. This is more than an order of magnitude improvement to recent vibrational spectroscopy measurements. Work on improving the long-term stability and repeatability of the emission is ongoing.

Having field-emitted electrons with such a narrow energy distribution coming from nanoscale spatial location raises a question about the ultimate limit in the width of the energy spectrum. For instance, in FN field emission at cryogenic temperatures the transverse and longitudinal uncertainties in momentum are $\sigma_{p\perp}\approx\sigma_{p\parallel}$. As an estimate, the size of the emission region was set to be the uncertainty in the position $\sigma_x\approx r_0=1.5$ nm and the uncertainty in the momentum was approximated from the energy distribution $\sigma_p\gtrsim\sqrt{}$ $\boxed{2m\Delta E}$ $=4.3\times10^{-16}$ eVs/nm of the measured $\Delta E=16$ meV. Then $\sigma_x\sigma_p\approx1.9\times(h/2)$, with the caveat that a calculated estimate value of $\sigma_x$ and a partial estimate in momentum, excluding $\sigma_{p\perp}$, were used. It reveals that the uncertainty product of the source is close to a factor of 2 from the Heisenberg limit.

In summary, a superconducting monocrystalline niobium nanotip field emitter at a temperature of 5.9 K with an ultranarrow tuneable energy distribution down to 16 meV FWHM, a small emission angle of 3.2° and a brightness of up to $3.8\times10^{8}$ A/($m^2$ sr V) was demonstrated. This was achieved by the fabrication of a nanoprotrusion at the tip apex, leading to a localized quantum state that mediates resonant tunneling through the Coulomb barrier beyond the Fowler-Nordheim model. Although the tip emission varies slightly after each preparation cycle, this low energy distribution was measured several times following tip preparation and could be reproduced with a completely new ion milled tip. The energy width is in the same range as the recently developed flat surface source based on near-threshold photoemission from single-crystal Cu(100) at 35 K with $\Delta E=11.5$ meV. However, the emission area of the source is orders of magnitude smaller, providing potential advantages in spatial coherence and brightness. It opens up new fields such as high-resolution vibrational spectroscopy in the electron microscope with sub-meV resolution when combined with a monochromator. It will improve electron energy loss spectroscopy, enabling isotopic analysis and mapping in transmission electron microscopy, decrease the impact of chromatic aberrations in low-voltage scanning electron microscopes, and enhance the accuracy in the study of band gaps or defects to the subnanometer level. The small spatial dimension of the beam emission area in the nanometer regime combined with the narrow energy distribution yields a high longitudinal and transversal coherence of this source. This will benefit emerging techniques such as multipass-transmission electron microscopy and quantum electron microscopy as well as quantum information science applications with coherent electrons or metrology with electron interferometers.

CONCLUSION

Further description of the embodiments described herein can be found in C. W. Johnson et al., "Near-Monochromatic Tuneable Cryogenic Niobium Electron Field Emitter," Phys. Rev. Lett. 129, 244802—Published 7 Dec. 2022 and C. W. Johnson et al., "Electron-Beam Source with a Superconducting Niobium Tip," Phys. Rev. Applied 19, 034036—Published 10 Mar. 2023, both of which are herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:

providing a nanotip field emitter, the nanotip field emitter including a nanoprotrusion at a tip of the nanotip field emitter;

cooling the nanotip field emitter to a temperature, the temperature being about 80 Kelvin or lower; and applying an electric field between an extraction electrode and the nanotip field emitter to induce emission of electrons from the nanotip field emitter to generate an electron beam, an electron energy distribution full width half maximum of the electron beam being about 10 millielectron volts to 70 millielectron volts.

2. The method of claim 1, wherein the tip of the nanotip field emitter has a radius of about 10 nanometers to 50 nanometers, and wherein a tip of the nanoprotrusion has a radius of about 1 nanometer to 5 nanometers.

3. The method of claim 1, further comprising:

increasing or decreasing the electric field to shift an electron emission energy peak of the electron bram towards a low-temperature Fermi edge.

4. The method of claim 1, wherein the electric field is about 200 V to 1500 V.

5. The method of claim 1, wherein the nanotip field emitter is a monocrystalline refractory metal.

6. The method of claim 1, wherein the nanotip field emitter is a monocrystalline refractory metal, and wherein the refractory metal is niobium or tungsten.

7. The method of claim 1, wherein the nanotip field emitter is a polycrystalline refractory metal.

8. The method of claim 1, wherein the nanotip field emitter is a polycrystalline refractory metal, and wherein the refractory metal is niobium or tungsten.

9. The method of claim 1, wherein the nanotip field emitter is under ultrahigh vacuum.

10. The method of claim 1, wherein a beam current of the electron beam is about 10 picoamperes to 6 nanoamperes.

11. The method of claim 1, wherein the temperature is about 6 Kelvin or lower.

12. The method of claim 1, wherein the temperature is about 4.2 Kelvin.

13. An apparatus comprising:

a vacuum chamber;

a nanotip field emitter positioned within the vacuum chamber, a tip of the nanotip field emitter including a nanoprotrusion;

an extraction electrode positioned within the vacuum chamber;

a cooling apparatus, the cooling apparatus operable to cool the nanotip field emitter to about 80 Kelvin or lower; and a power source, the power source operable to apply an electric field between the extraction electrode and the nanotip field emitter to induce emission of electrons from the nanotip field emitter to generate an electron beam, an electron energy distribution full width half maximum of the electron beam being about 10 millielectron volts to 70 millielectron volts.

14. The apparatus of claim 13, wherein the cooling apparatus comprises a cryostat, and wherein the cryostat includes a thermally conductive material in contact with the nanotip field emitter.

15. The apparatus of claim 13, wherein the tip of the nanotip field emitter has a radius of about 10 nanometers to 50 nanometers, and wherein a tip of the nanoprotrusion has a radius of about 1 nanometer to 5 nanometers.

16. The apparatus of claim 13, wherein the electric field is about 200 V to 1500 V.

17. The apparatus of claim 13, wherein the nanotip field emitter is a monocrystalline refractory metal.

18. The apparatus of claim 13, wherein the vacuum chamber is operable to generate an ultrahigh vacuum.

19. The apparatus of claim 13, wherein a beam current of the electron beam is about 10 picoamperes to 6 nanoamperes.

20. The apparatus of claim 13, wherein the cooling apparatus operable to cool the nanotip field emitter to about 6 Kelvin or lower.

* * * * *